United States Patent Office.

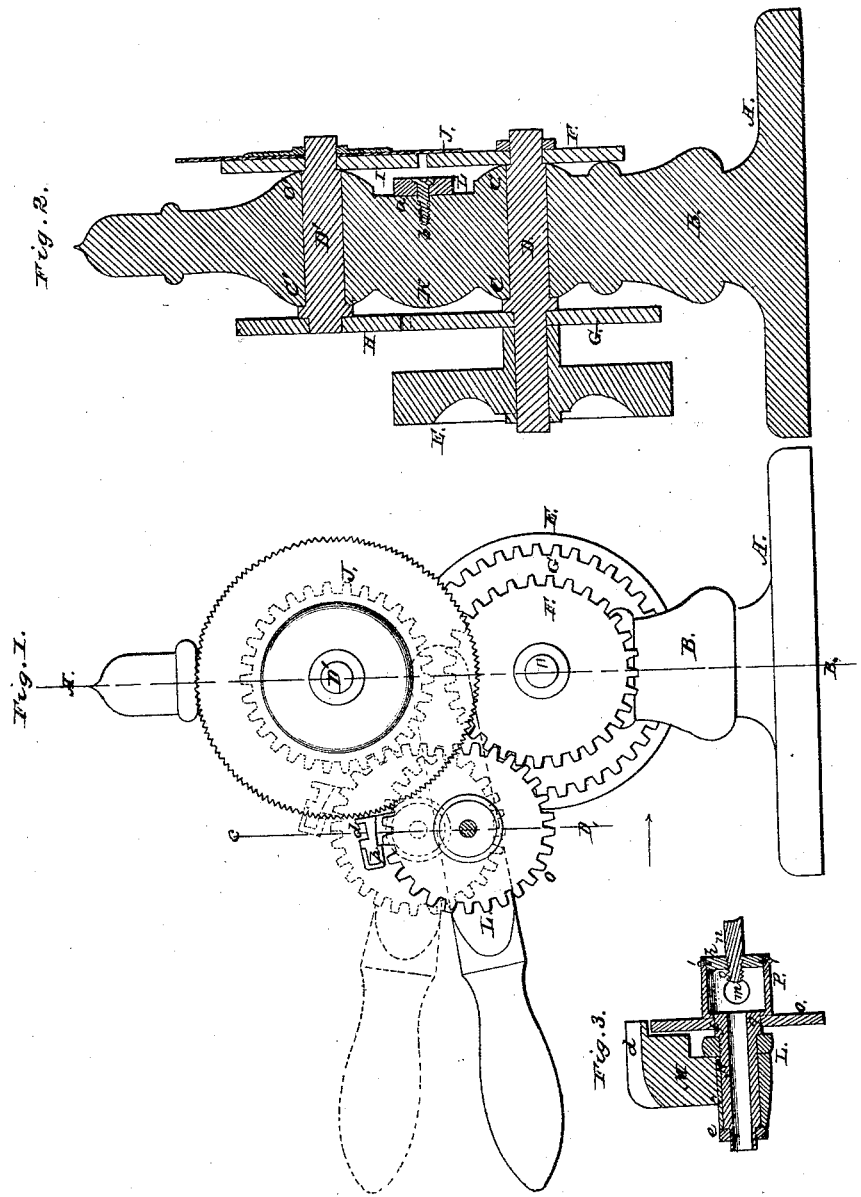

CLARK JILLSON, OF WORCESTER, MASSACHUSETTS.

Letters Patent No. 67,655, dated August 13, 1867.

---

IMPROVEMENT IN SCREW-CUTTING MACHINES.

---

*The Schedule referred to in these Letters Patent and making part of the same.*

---

KNOW ALL MEN BY THESE PRESENTS.

That I, CLARK JILLSON, of the city and county of Worcester, and Commonwealth of Massachusetts, have made certain new and useful Improvements in Screw-Cutting Machines, of which the following is a full, clear, and exact description, reference being had to the accompanying drawings, forming a part of this specification, in which—

Figure 1 represents a side view of my improved screw-cutting machine.

Figure 2 represents a vertical central section on line A B, fig. 1; and

Figure 3 represents a section on line C D, fig.

To enable those skilled in the art to which my invention belongs to make and use the same, I will proceed to describe it more in detail.

In the drawings, the part marked A is the base of the machine, from which rises the post or stand B, and which, in this instance, is cast with the base-piece A, and also with enlarged circular parts, as shown in the drawings. The form of the post or stand B is thus rendered ornamental, while the enlarged parts C C' serve as strong and firm bearing supports for the gear-shafts D D', which pass through pipe bearings in the post or stand B. To the lower shaft D is fastened the main driving-pulley E and two gears F and G. Gear G meshes into gear H, on one end of shaft D, which is also provided with a gear, I, arranged to run in line with gear F on shaft D, but not to mesh therewith. Upon the shaft D', and just outside of gear I, is fastened the saw J. One of the circular enlargements K on the stand or frame B does not extend quite around, but the frame or post B is made or cast with a flat surface, a, against which the inner end of lever L works, it being fulcrumed or hinged to the post or frame B by a screw-bolt, b. A frame-piece, M, is fastened to lever L, the top of which is slotted or grooved out, as seen at d. A tubular or hollow spindle, N, is fitted to turn in lever L and frame M. It passes through both, and is held in place by a nut, e, on its inner end, and a shoulder, f, on the other end. The outer end of spindle N is provided with a hub, g, upon which is fastened a gear, O, made so that it will mesh into either of the gears F and I, as will be hereafter explained. Outside of the hub g is the hollow die-holder P, in the outer open end of which is fastened the screw-cutting die h. In this instance it is made "solid," as it is called, that is, in one piece. The die is held in place by screws 1 1, which pass through the sides of the holder P, but any other suitable mode of holding may be employed. The die-holder is made with holes m, so that the operator can see the end of the screw as it is being cut. The holes m also permit chips and dirt, resulting from the operation, to drop out of the holder, and thus keep it from clogging up.

The operation is as follows: Motion being imparted to shaft D by pulley E, gears F G H I are caused to revolve, but gears F and I will run in opposite directions. The operator now takes hold of lever L with one hand, while with the other he holds the metal rod or wire n (a section of which is shown in fig. 3) with the other hand. When lever L is depressed so as to cause gear O to mesh into gear F, as shown in dark lines, fig. 1, the die-holder will also be revolved, and the operator enters the end of the rod or wire n in the die, when it is caught by the thread of the die h, and drawn into the die, and a thread, o, cut thereon, as shown in fig. 3. As soon as the thread o has been cut sufficiently far upon the rod or wire, the operator raises lever L, as shown in red lines in fig. 1, thereby throwing gear O out of mesh with gear F and into mesh with gear I, thus causing the die-holder and its die to turn in the other direction, which causes the end of the rod or wire n upon which the thread has been cut to run out of the die. As soon as the end of the rod or wire is free from the die, the operator lowers lever L, so that he can place the end of the rod in the slot or recess d in the top of frame M, and then forces lever L up again, when the saw J will cut off the partially-formed screw, and the operation is repeated until the desired number of screws have been cut. It will be observed that the main driving-shaft revolves in one direction all of the time, and that the forward and back motions of the die-holder are obtained by simply throwing the gear O alternately into mesh with gears F and I. As gear G is much larger than the gear F, the die-holder is revolved with much greater velocity when gear O is in mesh with gear F; consequently the die-holder moves comparatively slower when cutting the thread than what it does when running the end of the rod or wire out. Guides or stops may be combined with both the tube N and frame M, to facilitate the cutting of screws of exact lengths. It will be understood that screws of different lengths can be cut as the rod or wire can be run through the tube N.

The machine above described is designed to cut what are called machine screws, but the same principle can be applied to cutting headed screws and bolts. The main driving-shaft does not have to be stopped to stop the die, since by means of lever L the die can be stopped, whenever desired, by simply moving it so that gear O will be out of mesh with both gears, F and I. After the screws have been cut off they can be placed in the slot or recess $p$ in the side of frame M, with their heads toward the saw J, when, if lever L is raised, the head of the screw will be nicked or slotted. The screws can be held in slot or recess $p$ by the hand, or by some simple and convenient mechanism. Stops are combined with the stand or post B, to stop lever L, to prevent gear O from meshing in too deep in the gears F and I. An adjustable stop may be arranged so as to nick or slot the heads of screws of different lengths in a uniform manner.

My machine is simple and effective in operation, and is capable of performing the work in an accurate and expeditious manner.

Having described my improved machine for cutting screws, what I claim therein as new, and of my invention, and desire to secure by Letters Patent, is—

1. In a machine for cutting screws, the combination of the die-holder with the mechanism for rotating the same, arranged substantially as and for the purposes herein described.

2. The combination of the die-holder and gear-wheel O, or equivalent means for rotating the same, with lever L, substantially as and for the purposes set forth.

3. The combination with lever L of the die P and tubular shaft or spindle N and gear O, or other suitable means for imparting rotary motion to the same, substantially as and for the purposes set forth.

4. The combination of the die-holder and its swinging or vibratory lever with the mechanism for revolving said die-holder, in the manner herein described, and for the purposes set forth.

5. The combination of the grooved frame M, or equivalent means for supporting and holding the screw under the action of the saw, with the lever L and saw J, substantially as and for the purposes set forth.

6. The combination of the frame M, slotted or recessed at $p$, with the lever L and saw J as and for the purposes set forth.

C. JILLSON.

Witnesses:
  THOS. H. DODGE,
  GEO. H. MILLER.